US008110319B2

(12) United States Patent
Nguyen et al.

(10) Patent No.: US 8,110,319 B2
(45) Date of Patent: Feb. 7, 2012

(54) FUEL CELL STACK COMPONENTS

(75) Inventors: Dien Nguyen, San Jose, CA (US); Ian Russell, Sunnyvale, CA (US); Matthias Gottmann, Sunnyvale, CA (US); Deepak Bose, Fremont, CA (US); Darren Hickey, Mountain View, CA (US); Stephen Couse, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 246 days.

(21) Appl. No.: 12/010,884

(22) Filed: Jan. 30, 2008

(65) Prior Publication Data

US 2008/0193825 A1    Aug. 14, 2008

Related U.S. Application Data

(60) Provisional application No. 60/887,398, filed on Jan. 31, 2007.

(51) Int. Cl.
*H01M 8/04* (2006.01)

(52) U.S. Cl. ......... 429/514; 429/457; 429/456; 429/454

(58) Field of Classification Search .................. 429/12, 429/24, 26, 34, 38, 39, 454, 456, 457, 458, 429/513, 514
See application file for complete search history.

(56) References Cited

U.S. PATENT DOCUMENTS

| 4,292,379 A | * | 9/1981 | Kothmann ...................... 429/17 |
| 6,251,534 B1 | | 6/2001 | McElroy |
| 6,348,280 B1 | * | 2/2002 | Maeda et al. .................. 429/457 |
| 6,406,809 B1 | * | 6/2002 | Fujii et al. ...................... 429/34 |
| 6,777,126 B1 | | 8/2004 | Allen |
| 6,803,136 B2 | | 10/2004 | Ong et al. |
| 6,835,488 B2 | | 12/2004 | Sasahara et al. |
| 6,945,266 B2 | | 9/2005 | De Tezanos Pinto |
| 2002/0132156 A1 | | 9/2002 | Ruhl et al. |
| 2004/0265675 A1 | * | 12/2004 | Woodcock et al. ............. 429/38 |
| 2005/0008921 A1 | | 1/2005 | Johnson |
| 2005/0255364 A1 | * | 11/2005 | Cho et al. ........................ 429/38 |
| 2007/0042257 A1 | * | 2/2007 | Chyou et al. .................... 429/38 |
| 2008/0199738 A1 | | 8/2008 | Perry et al. |

FOREIGN PATENT DOCUMENTS

| KR | 10-2006-0019998 A | 3/2006 |
| WO | WO 2004/102706 A2 | 11/2004 |

OTHER PUBLICATIONS

U.S. Appl. No. 12/268,585, filed Nov. 11, 2008, James F. McElroy.
Office Action received in U.S. Appl. No. 12/010,884 (20 pgs), Sep. 30, 2009.

* cited by examiner

*Primary Examiner* — Ula C Ruddock
*Assistant Examiner* — Heng Chan
(74) *Attorney, Agent, or Firm* — The Marbury Law Group, PLLC

(57) ABSTRACT

An interconnect for a fuel cell stack includes a first set of gas flow channels in a first portion of the interconnect, and a second set of gas flow channels in second portion of the interconnect. The channels of the first set have a larger cross sectional area than the channels of the second set.

25 Claims, 14 Drawing Sheets

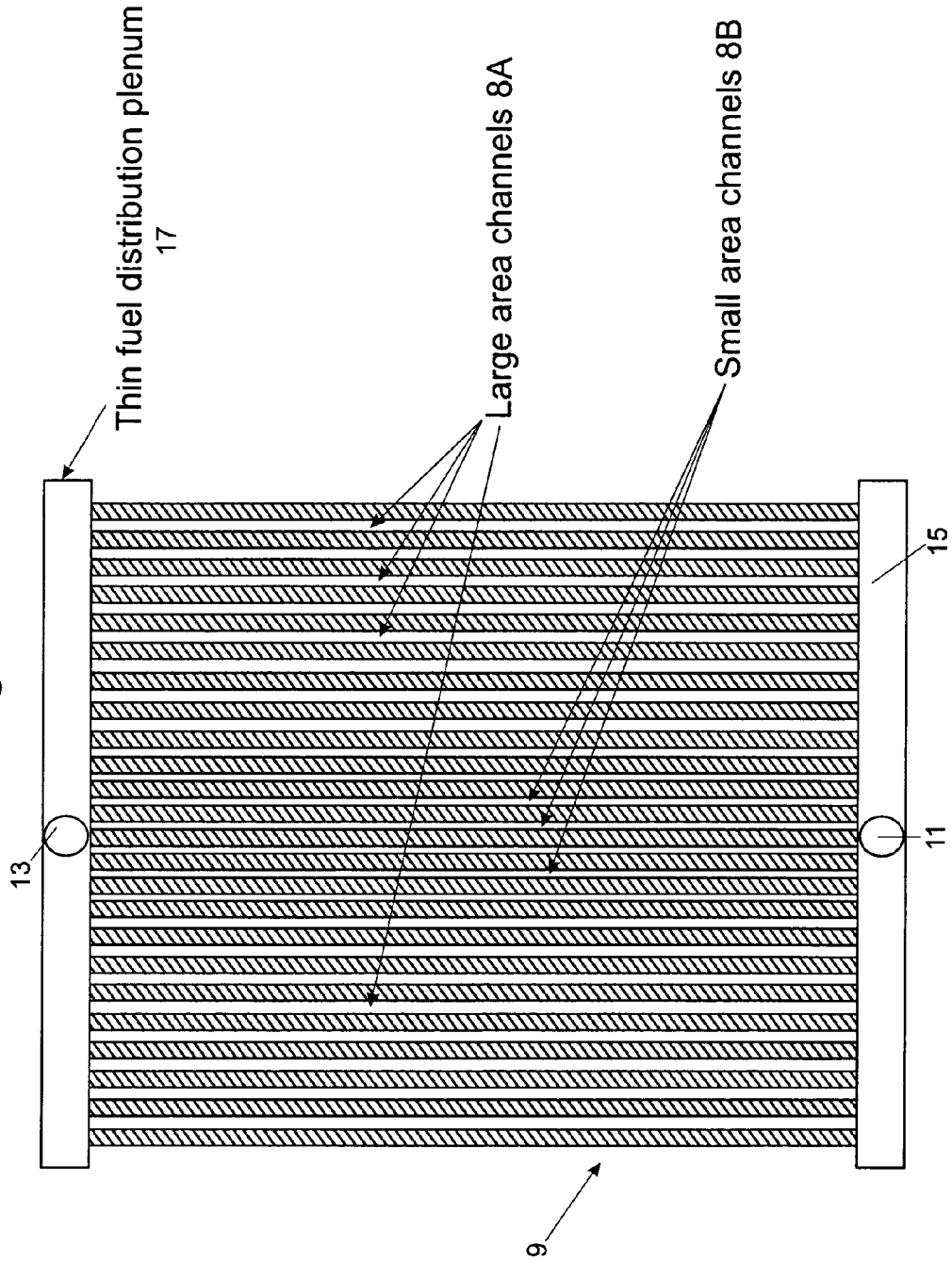

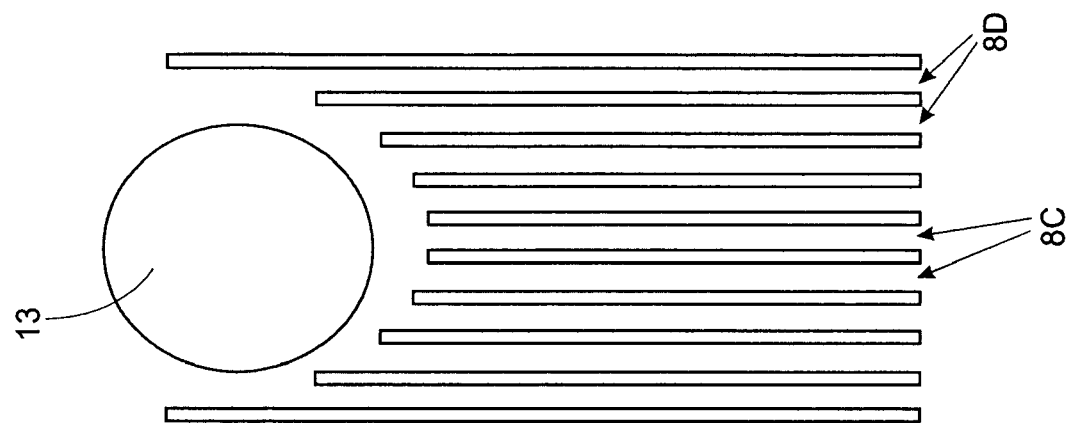

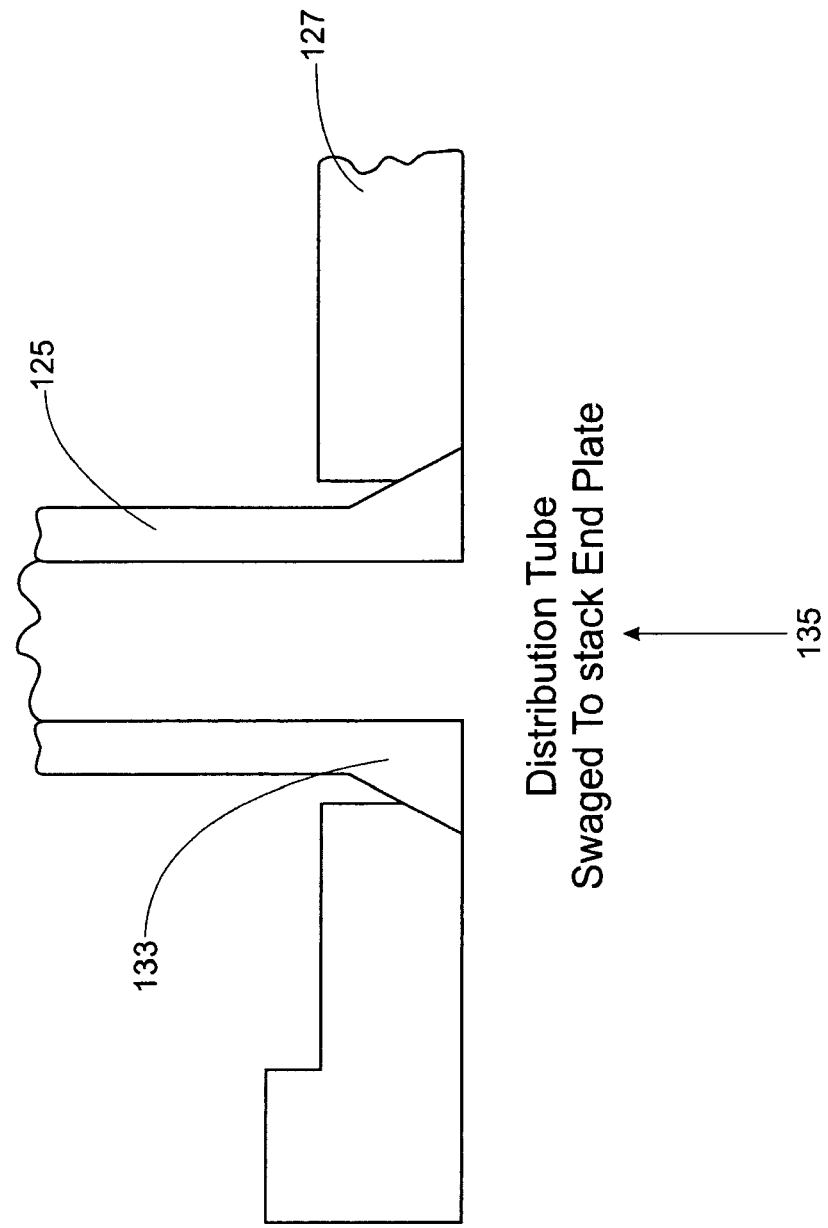

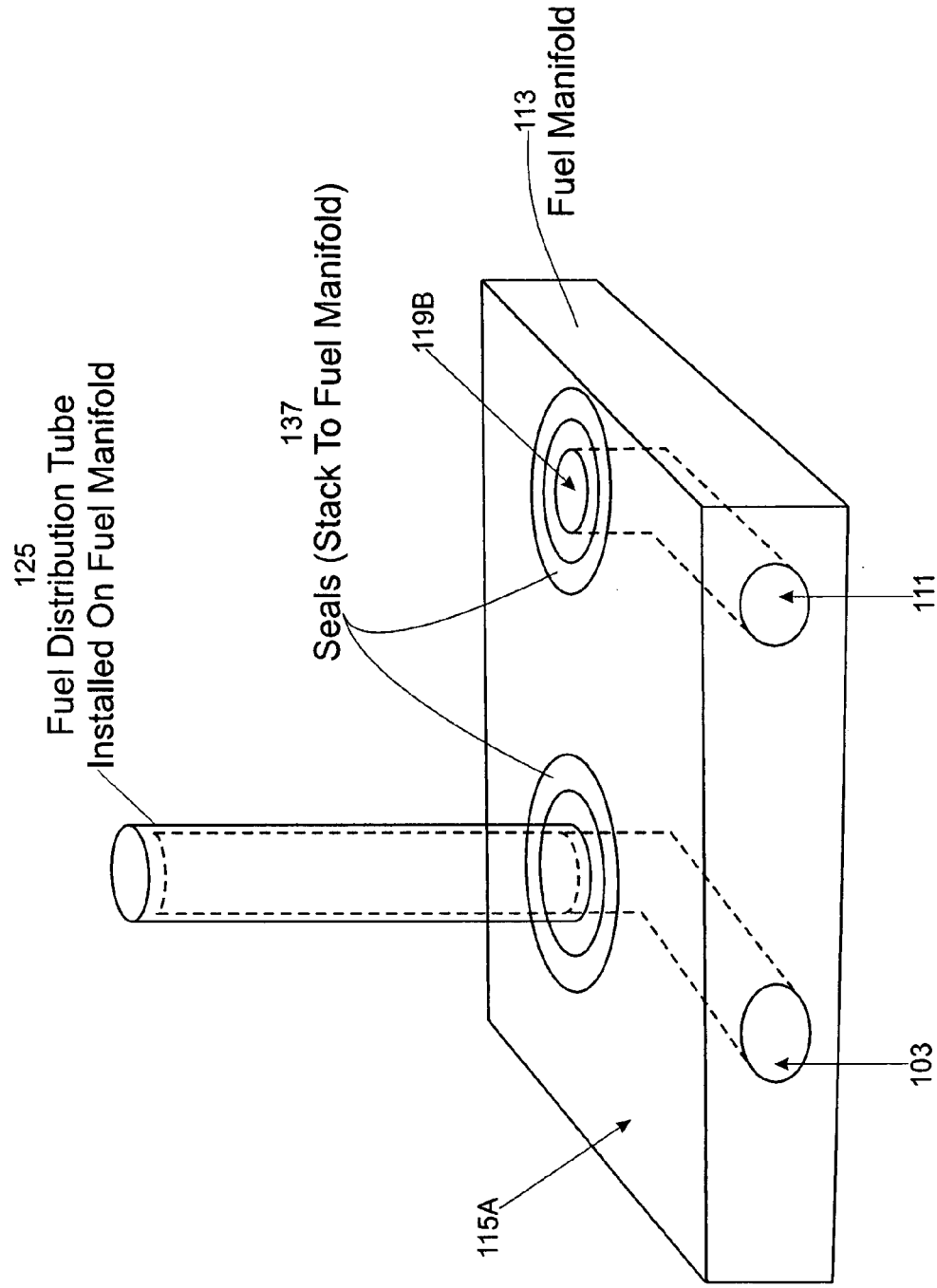

FUEL CELL STACK COMPONENTS

CROSS-REFERENCE TO RELATED PATENT APPLICATIONS

The present application claims benefit of U.S. provisional application 60/887,398, filed Jan. 31, 2007, which is incorporated herein by reference in its entirety.

BACKGROUND OF THE INVENTION

The present invention is generally directed to fuel cell components, and to solid oxide fuel cell stack components in particular.

Fuel cells are electrochemical devices which can convert energy stored in fuels to electrical energy with high efficiencies. In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

SUMMARY OF THE INVENTION

One aspect of the present invention provides an interconnect for a fuel cell stack, comprising a first set of gas flow channels in a first portion of the interconnect, and a second set of gas flow channels in second portion of the interconnect. The channels of the first set have a larger cross sectional area than the channels of the second set.

Another aspect of the present invention provides a fuel cell stack comprising a plurality of alternating interconnects and fuel cells stacked in an axial direction. Each interconnect contains a fuel inlet opening and each fuel cell contains a fuel inlet opening. A fuel inlet riser channel is formed by aligned fuel inlet openings in the interconnects and in the fuel cells. A fuel inlet distribution tube is located in the fuel inlet riser channel.

BRIEF DESCRIPTION OF THE DRAWINGS

FIGS. 2A-2C are top views of interconnects according to the first embodiment of the invention.

FIGS. 3B and 3E are three dimensional views of the fuel manifold shown in FIGS. 3A and 3C, respectively. FIG. 3D is a side cross sectional view of a connection between a distribution tube and an end plate in the stack of FIG. 3C.

DETAILED DESCRIPTION OF THE EMBODIMENTS

Fuel cell stacks are frequently built from a multiplicity of fuel cells in the form of planar elements, tubes, or other geometries. Fuel and air has to be provided to the electrochemically active surface, which can be large. While solid oxide fuel cells are preferred, other fuel cell types, such as molten carbonate, PEM, phosphoric acid, etc., may also be used instead of SOFCs.

Figure 1:
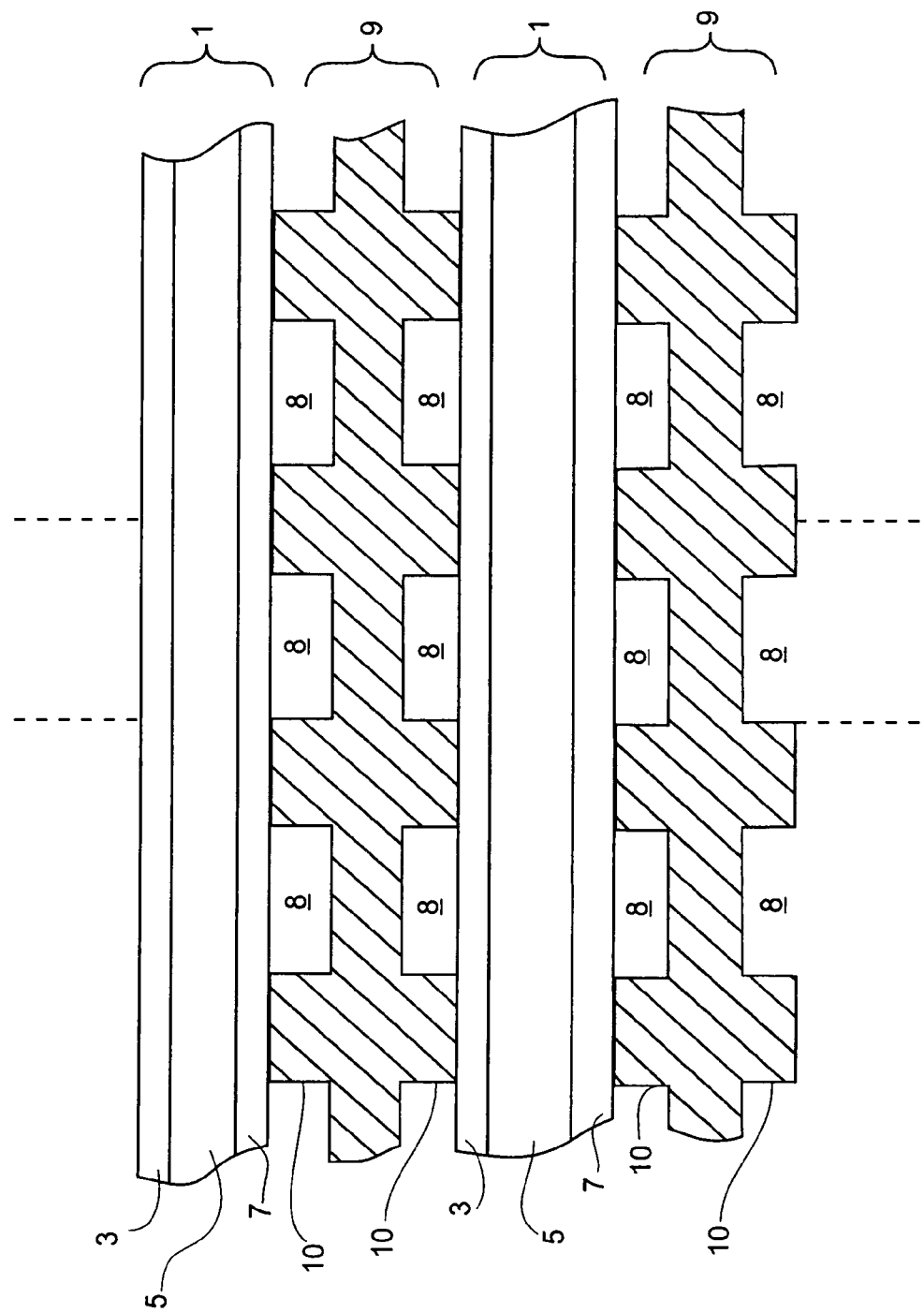
FIG. 1 illustrates a side cross sectional view of a SOFC stack of an embodiment of the invention.

As shown in FIG. 1, each SOFC 1 includes an anode electrode 3, a solid oxide electrolyte 5 and a cathode electrode 7. The anode electrode 3 may comprise a cermet comprising a nickel containing phase and a ceramic phase. The nickel containing phase preferably consists entirely of nickel in a reduced state. This phase forms nickel oxide when it is in an oxidized state. Thus, the anode electrode is preferably annealed in a reducing atmosphere prior to operation to reduce the nickel oxide to nickel. The nickel containing phase may include other metals in additional to nickel and/or nickel alloys. The ceramic phase may comprise a stabilized zirconia, such as yttria and/or scandia stabilized zirconia and/or a doped ceria, such as gadolinia, yttria and/or samaria doped ceria. The electrolyte 5 may comprise a stabilized zirconia, such as scandia stabilized zirconia (SSZ) or yttria stabilized zirconia (YSZ). Alternatively, the electrolyte 5 may comprise another ionically conductive material, such as a doped ceria. The cathode electrode 7 may comprise an electrically conductive material, such as an electrically conductive perovskite material, such as lanthanum strontium manganite (LSM). Other conductive perovskites, such as LSCo, etc., or metals, such as Pt, may also be used. The cathode electrode 7 may also contain a ceramic phase similar to the anode electrode. The electrodes and the electrolyte may each comprise one or more sublayers of one or more of the above described materials.

Another component of a fuel cell stack is the so called gas flow separator (referred to as a gas flow separator plate in a planar stack) 9 that separates the individual cells in the stack. The gas flow separator plate separates fuel, such as a hydrogen and/or a hydrocarbon fuel, flowing to the fuel electrode (i.e. anode 3) of one cell in the stack, from oxidant, such as air, flowing to the air electrode (i.e. cathode 7) of an adjacent cell in the stack. The separator 9 contains gas flow passages or channels 8 between the ribs 10. Frequently, the gas flow separator plate 9 is also used as an interconnect which electrically connects the fuel electrode 3 of one cell to the air electrode 7 of the adjacent cell. In this case, the gas flow separator plate which functions as an interconnect is made of or contains electrically conductive material. The interconnect 9 may be formed from a metal alloy, such as a chromium-iron alloy, or from an electrically conductive ceramic material. Preferably, but not necessarily, the interconnect material has a similar coefficient of thermal expansion to that of the fuel cell electrolyte 5. An electrically conductive contact layer, such as a nickel contact layer, may be provided between the anode electrode and the interconnect. Another optional electrically conductive contact layer may be provided between the cathode electrode and the interconnect. FIG. 1 shows that the lower SOFC 1 is located between two interconnects 9. While a vertically oriented stack is shown in FIG. 1, the fuel cells may be stacked horizontally or in any other suitable direction between vertical and horizontal.

The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, plural stacks may share the same end plates. In this case, the stacks jointly comprise a distinct electrical entity. In this case, the electrical power output from both stacks cannot be separately controlled.

First Embodiment

Interconnect With Variable Channel Areas

In the first embodiment shown in FIG. 2A, one set of gas flow channels 8A in one portion of the interconnect 9 has a different (i.e., larger) cross sectional area than another set of gas flow channels 8B in a different portion of the interconnect 9. Both sets of gas flow channels 8A and 8B are located on the same side of the interconnect 9, such as the fuel side of the interconnect which faces the anode electrode 3 of the adjacent cell. Preferably, but not necessarily, each gas flow channel has the same cross sectional area throughout its length. In other words, the cross sectional area (i.e., width and depth) of each channel does not change in the channel length direction (i.e., in the direction from the fuel inlet to the fuel outlet).

In FIG. 2A, the inlet 11 and outlet 13 are shown as fuel inlet and outlet openings in the interconnect 9. This interconnect is configured for a fuel cell stack which is internally manifolded for fuel, in which the fuel travels through the stack through fuel riser channels which are formed by mated openings through the stacked interconnects and fuel cells. However, if desired, the interconnect 9 may be configured for a stack which is externally manifolded for fuel. In this case, the top and bottom edges of the interconnect 9 shown in FIG. 2A would function as fuel inlet and outlet, respectively, for the fuel which flows externally to the stack. Furthermore, the interconnect 9 shown in FIG. 2A is configured for a stack which is externally manifolded for air. However, additional openings through the interconnect may be formed on the left and right sides of the interconnect for the interconnect to be configured for a stack which is internally manifolded for air.

FIG. 2A illustrates an interconnect with fuel distribution plenums 15, 17. Each plenum 15, 17 is a groove in the interconnect which surrounds the respective inlet 11 and outlet 13 opening. The plenum 15 distributes the fuel from the inlet opening 11 to the channels 8. Plenum 17 collects the fuel or fuel exhaust from the channels and provides it to the outlet opening 13. The channels 8 in the interconnect may be subjected to different pressure drops and unequal fuel flow distribution. Generally, there may be several sources of fuel misdistribution, such as different channel length in different portions of the interconnect and/or the finite pressure drop inside the plenums 15, 17.

In a first aspect of the first embodiment, the first set of gas flow channels 8A have a larger width than the second set of gas flow channels 8B. The channels 8A that are subjected to lower pressure drops have a larger width than the channels 8B subjected to a higher pressure drop, such that the gas flow, such as fuel flow, through channels 8A is substantially equal to the gas flow through channels 8B. Thus, despite the different pressure drops in different channels, the fuel flow through all channels is substantially equal due to the difference in cross sectional area between different channels. For example, as shown in FIG. 2A, the channels 8B located in the middle region of the interconnect between the gas inlet 11 and the gas outlet 13 openings have smaller width than the channels 8A in peripheral regions of the interconnect which are laterally spaced from the imaginary line between the inlet 11 and the outlet 13. Thus, the gas flow rate, such as fuel flow rate, through all channels 8A, 8B in the interconnect is about equal.

In the configuration of FIG. 2A, all channels 8 have the same length. However, if desired, the channels 8 may have different lengths as shown in FIG. 2B. As shown in FIG. 2B, the middle channels 8C with a smaller cross sectional area have a shorter length than the peripheral channels 8D with a larger cross sectional area. For example, channels 8C located between the openings 11, 13 are narrower than the peripheral channels 8D. Thus, the length disparity between channels 8C and 8D and the corresponding difference in pressure drop due to difference in channel length is compensated by the difference in cross sectional area while maintaining a substantially equal gas flow through all channels. The variable length and offsetting area of the channels offers the flexibility to conform the channels around non-rectangular features, such as openings 11, 13 and seals without sacrificing the equal fuel flow through all channels. This may be especially important for taller stacks which require larger diameter openings 11, 13 and large area seals around the openings.

Figure 2C:
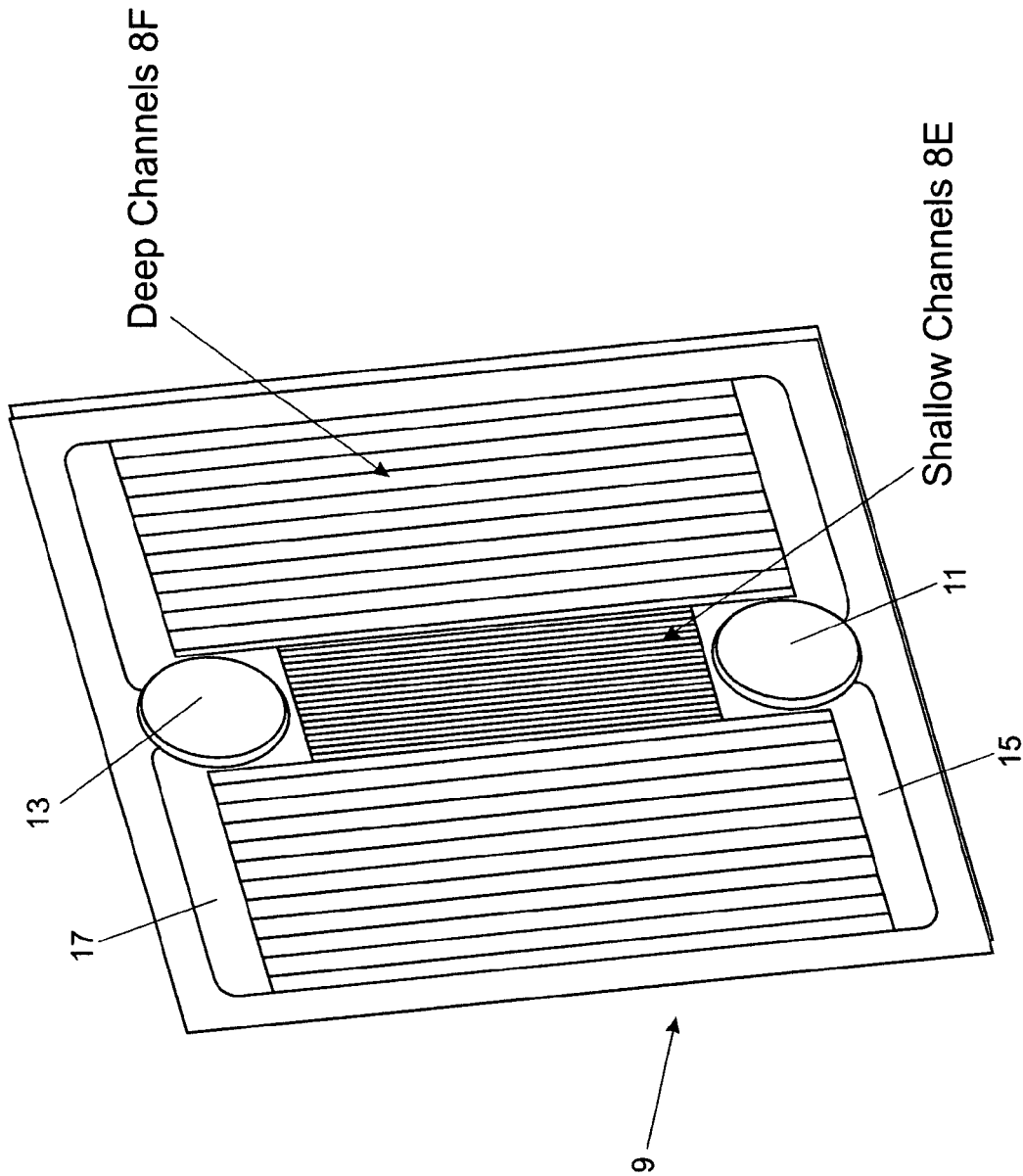

While FIGS. 2A and 2B illustrate channels with different width to obtain a difference in cross sectional area, the depth and/or the shape of the channels may also be varied to vary the cross sectional area. Thus, the channels in different portions of the interconnect may have a different width and/or depth and/or shape to obtain a difference in cross sectional area which results in a substantially equal gas flow through all channels. FIG. 2C illustrates an interconnect in which the middle channels 8E are shallower than peripheral channels 8F. Channels 8E may also be shorted than channels 8F. Furthermore, the difference in cross sectional area may be achieved by varying the cross sectional shape of the channels, where the different shapes are selected from triangular, rectangular, semi-circular, semi-oval, etc. shapes.

While the fuel side of the interconnect 9 is shown in FIGS. 2A-C, the channels on the air side of the interconnect may also have a similar difference in cross sectional area. Furthermore, while only two sets of channels are shown in FIGS. 2A-2C, the interconnect may have three or more sets of channels with different cross sectional areas from each other. If desired, the cross sectional area of the channels may be graded across the interconnect, such that each channel may have a different cross sectional area from an adjacent channel. For example, the central channel directly between the openings 11, 13 may have the smallest cross sectional area, while the cross sectional area of the channels on either side of the central channel increases with distance from the central channel, such that the edge channels on either side of the interconnect have the largest cross sectional area.

The different channel cross sectional area provides a uniform gas (i.e., fuel and/or air) flow through the channels over (or under) the adjacent fuel cell, while maintaining the maximum electrochemically active area. The uniform gas flow through the interconnects provides a uniform current density and temperature for the fuel cells of the stack, which lead to an improved power output control, lower thermal stresses and lower cell degradation.

If desired, rather than designing the difference in cross sectional area to achieve a uniform flow through all channels, the cross sectional area of the channels may be optimized to adjust the fuel flow rates to match the expected current distribution in the fuel cell adjacent to each interconnect. Thus, channels in the portion(s) of the interconnect adjacent to the portion(s) of the fuel cell which experiences a higher current have a larger cross sectional area than channels in the portion(s) of the interconnect adjacent to the portion(s) of the fuel cell which experiences a lower current to provide more fuel to the higher current portion(s) of the cell.

Second Embodiment

Fuel Cell Stack With Flow Equal Per Layer

Fuel utilization is an important operating parameter for a fuel cell. Fuel utilization directly and linearly affects the electrical efficiency of a fuel cell electrical power generator. In most fuel cells, the fuel utilization is limited by fuel flow maldistribution inside the fuel cells. In a typical solid oxide fuel cell (SOFC), the anode is made of a cermet material (e.g. nickel and stabilized zirconia), which has to be kept under reducing environment at all times to maintain its performance. If any of the fuel cells in the stack receive less fuel than the rest of the fuel cell, then oxidation of the anode may occur.

Planar fuel cells are usually assembled with a number of cells in series into fuel cell stacks. If there is a fuel maldistribution within one layer of a fuel cell stack (i.e., fuel maldistribution across the surface of one anode electrode of one fuel cell of the stack), then the current density inside this layer can usually adapt and more current will flow where more fuel is available, thereby reducing the risk of anode oxidation. However, if there is a maldistribution from layer to layer of the stack (i.e., if there is fuel maldistribution between separate fuel cells of the stack), then there is no such safety. Since all layers (i.e., the interconnects and the cells) of the stack are electrically connected in series, they have to conduct the same current. Should the amount of fuel available in one particular layer not be enough for the current through all cells, then starvation and damage of the anode are quite likely.

In one common design of fuel cell stacks referred to as "internally manifolded for fuel", the fuel is distributed from layer to layer by a so called riser channel. This is a series of aligned openings in every layer (i.e., openings through each fuel cell and interconnect) which allows fuel to flow from the inlet end of the stack to each and every cell. Specifically, the fuel inlet riser channel is formed by aligned fuel inlet openings in the interconnects and in the fuel cells while the fuel outlet riser channel is formed by aligned fuel outlet openings in the interconnects and in the fuel cells.

Figure 3A:
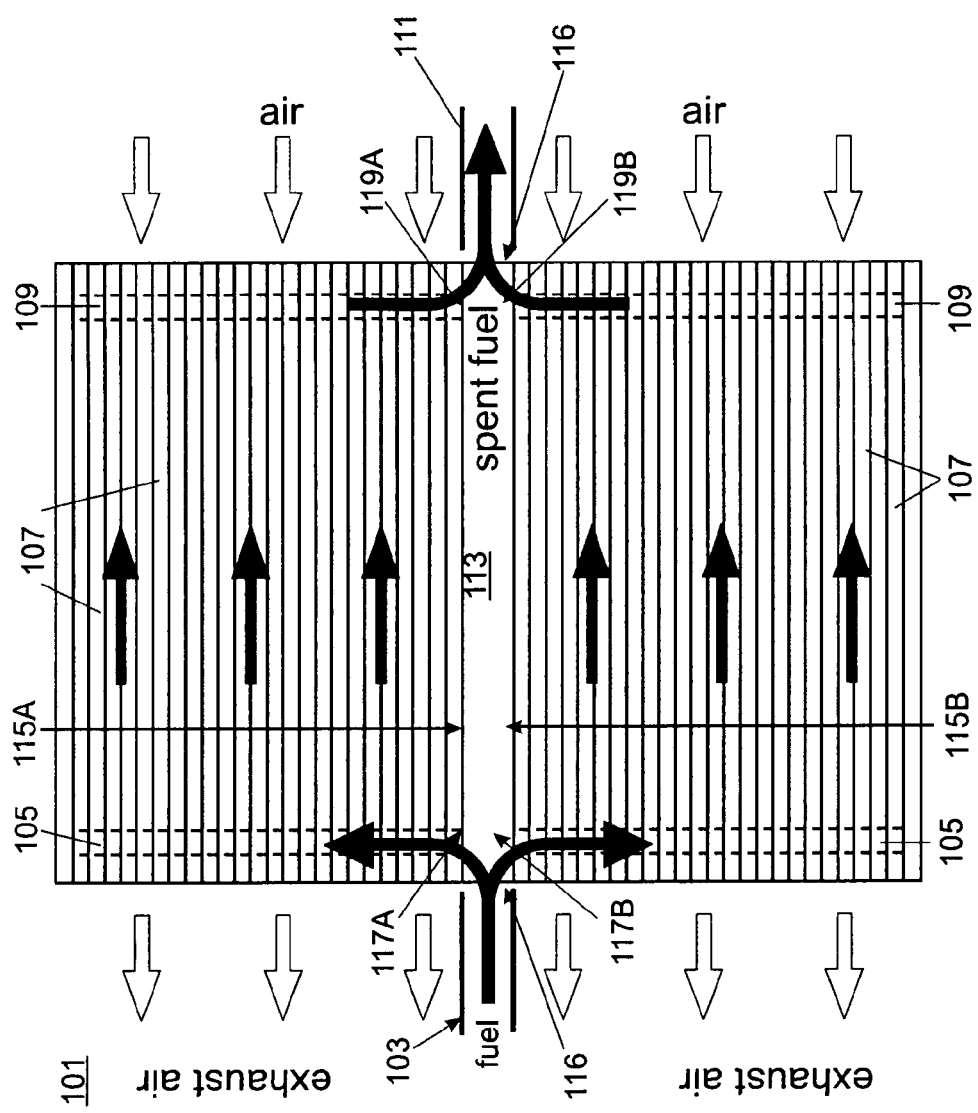
FIGS. 3A and 3C are side cross sectional views of fuel cell stacks of the second embodiment of the invention.

These riser channels always impart a finite pressure drop on the fuel flowing through the riser. This implies that layers further away from the inlet receive fuel at lower pressure than those nearer the inlet. In some designs this is partially compensated by running the exhaust riser parallel to inlet riser (so called "Z-flow" in which the fuel inlet stream and the fuel exhaust stream flow are parallel and concurrent to the each other, with the fuel inlet stream crossing the stack at each anode electrode). However, due to the simplicity in manifolding a configuration with opposing flow in the riser channels (so-called "U-flow" in which the fuel inlet stream and the fuel exhaust stream flow in opposite directions) is often used. In this configuration, the inlet and the outlet are at the same end of the stack, such as at the bottom of the stack, or in a manifold located in a middle of a stack. A stack 101 which is internally manifolded for fuel with U-flow configuration and a fuel manifold is shown in FIG. 3A.

The stack 101 contains a fuel inlet riser channel 105 and a fuel outlet riser channel 109. If desired, the stack may contain plural fuel inlet riser channels 105 and/or plural fuel outlet riser channels 109. The stack 101 is externally manifolded for air and contains no air riser channels.

In the stack 101, at least one fuel delivery port 103 and at least one fuel outlet port 111 is connected to at least one fuel manifold 113 located between adjacent plate shaped fuel cells 107, such as SOFCs (the interconnects between the cells are omitted for clarity from this Figure). If desired, the stack 101 may contain a plurality of fuel manifolds 113 located throughout the stack, such that each one of a plurality of fuel delivery ports 103 and fuel outlet ports 111 is connected to a respective one of a plurality of fuel manifolds 113. The stack 103 comprises a complete and independent electrical entity. In another example, the stack 103 contains only one fuel manifold 113 which is located between adjacent plate shaped fuel cells 107. In other words, the fuel manifold 113 is located between the fuel cells 107 in the stack rather than at the edge of the stack between the last (i.e., edge) fuel cell in the stack and an end plate of the stack.

Figure 3B:
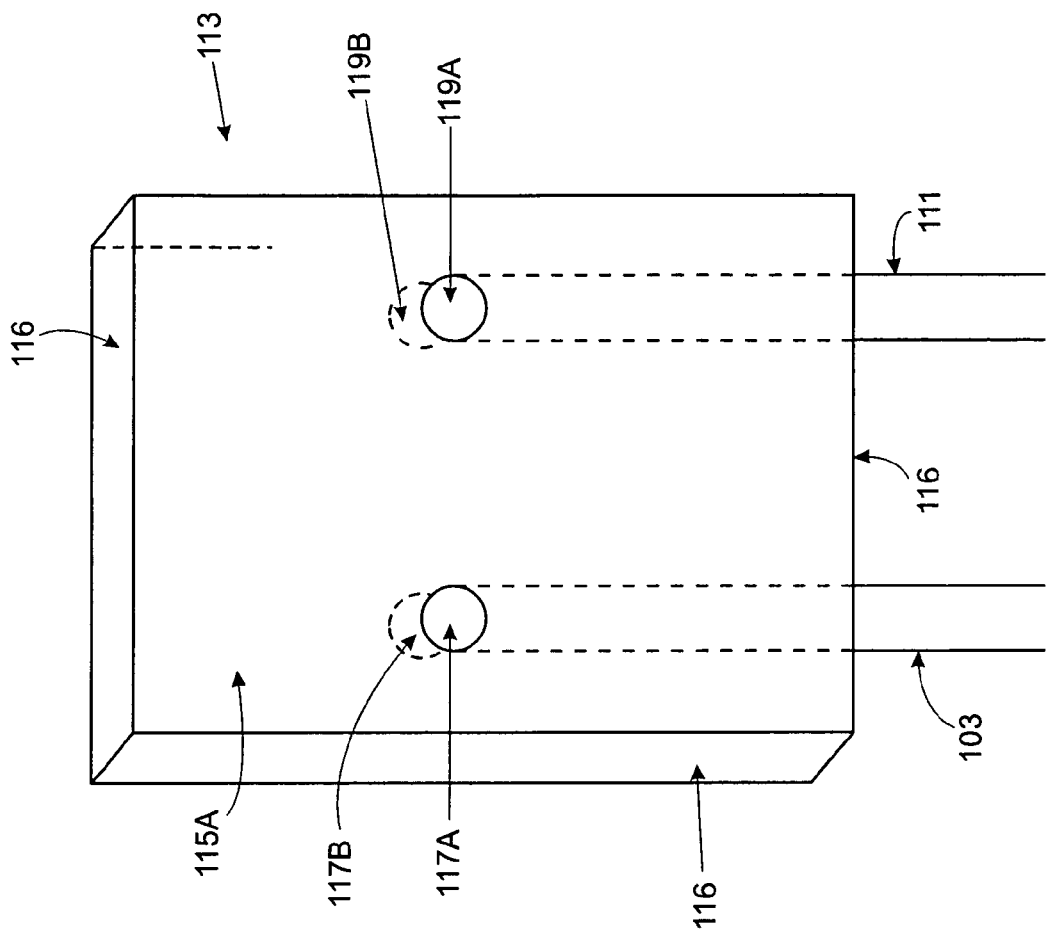

The fuel manifold 113 may have any suitable configuration, such as a pipe or chamber configuration. For example, as shown in FIG. 3B, the fuel manifold may comprise a chamber configured as a plate shaped box. The box may have any suitable cross sectional shape, preferably a shape which matches the cross sectional shape of the fuel cells. For example, the cross sectional shape of the fuel manifold may comprise a polygon, such as a triangle, rectangle, square, etc., a circle, an oval or other suitable shape. The plate shaped box 113 contains major surfaces 115 or faces and narrower edge surfaces 116.

The box 113 contains at least one fuel delivery opening 117 in fluid communication with fuel cell fuel inlet riser channel 105 and at least one fuel outlet opening 119 in fluid communication with fuel cell fuel outlet riser channel 109. For example, as shown in FIGS. 3A and 3B, a first fuel delivery opening 117A and a first fuel outlet opening 119A are located in a first major plate face 115A of the plate shaped box, and a second fuel delivery opening 117B and a second fuel outlet opening 119B are located in a second major plate face 115B (shown in FIG. 3A) of the plate shaped box 113. The fuel manifold 113 also contains the fuel delivery port 103 comprising a fuel inlet conduit adapted to provide a fuel inlet stream into the fuel manifold 113. The fuel manifold 113 also contains the fuel outlet port 111 comprising a fuel outlet conduit adapted to remove a spent fuel outlet or exhaust stream from the fuel manifold 113. Preferably, the fuel inlet and outlet conduits 103, 111 are located non-parallel with the fuel inlet 105 and outlet 109 riser channels. For example, as shown in FIGS. 3A and 3B, the fuel inlet and outlet conduits 103, 111 are located perpendicular to the fuel inlet 105 and outlet 109 riser channels (i.e., the fuel inlet and outlet conduits 103, 111 are located perpendicular to the direction in which fuel inlet 105 and outlet 109 riser channels extend). There may be plural inlet and/or outlet conduits 103, 111 and plural openings 117, 119 if the stack 101 contains plural inlet and/or outlet riser channels 105, 109.

In an alternative configuration, the stack may be internally manifolded for air and also contain one or more air inlet and outlet riser channels. In another alternative configuration, the stack may be semi-internally manifolded for fuel, such that the stack contains at least one fuel inlet riser channel 105 but no fuel outlet riser channels 109. In this configuration, the fuel inlet stream is internally manifolded through the riser channel(s) 105 in the stack, while the fuel outlet stream is either separately externally manifolded or combined with the air outlet stream in the air outlet passage.

As shown in FIG. 3A, the fuel manifold 113 introduces fresh fuel from fuel inlet port 103 into the fuel inlet riser channels 105 through fuel delivery openings 117A and 117B. The fuel flows from the fuel inlet riser channels 105 through the fuel cells 107 (i.e., through fuel flow channels between the fuel (anode) electrodes and the gas separator/interconnect plates) and into the fuel outlet riser channels 109. The spent or exhausted fuel (i.e., fuel exhaust) is provided from the fuel outlet riser channels 109 into the fuel outlet openings 119A and 119B of the fuel manifold. The exhausted fuel is then removed from the stack 101 via the fuel outlet port 111. In the vertically positioned stack 101, the fuel flows up and down to and from the manifold 113 through channels 105 and 109. However, if the stack 101 is positioned horizontally, then the fuel would flow in horizontal planes through channels 105, 109.

FIG. 3A also shows the oxidizer (i.e., air) flow in the fuel cell stack 101 that has an external manifolding configuration on the oxidizer side. The oxidizer (i.e., air) is provided from one side of the stack 103, travels through the fuel cells 107 (i.e., between the oxidizer (cathode) electrodes and gas separator/interconnect plates) and exits on the opposite side of the stack 103. In solid oxide fuel cells, a portion of the oxidizer (i.e., oxygen present in air) is transported through the fuel cell electrolyte in the form of oxygen ions and reacts with the fuel to generate the fuel exhaust, such as water. FIG. 3A shows a flow configuration where fuel and air flow in parallel but opposite directions along the fuel cells 107. However, fuel and air may flow in parallel and same direction, or in perpendicular directions or any directions in between parallel and perpendicular if desired. Furthermore, as noted above, the stack 101 may instead have an internal manifolding configuration on the air side.

The effect of the pressure drop in riser channels is usually mitigated by a carefully designed balance of pressure drops within the stack. Typically, the pressure drop of the flow through one individual layer (i.e., flow between a given interconnect and an adjacent fuel cell anode) is kept at least one order of magnitude larger than the total pressure drop in the riser channel. In a situation where pressure drop is roughly proportional to flow rate (as is the case in laminar flow) even a factor ten difference in pressure drop still leads to a ten percent lower flow in the layer furthest away from the inlet.

This problem becomes more serious as stacks are built taller. Since manifolding accounts for a significant portion of the cost of a fuel cell system, taller stacks help reduce manifolding and thereby reduce cost and complexity. The amount of flow to be handled by the riser channels increases linearly with the number of layers to be fed.

For taller stacks, the riser channels have to have progressively larger cross sections. Larger cross section riser channels reduce the available active area and increase sealed length (circumference of the riser channel).

One way to mitigate this difficulty is to increase the pressure drop in each layer. Smaller and smaller features within each layer can increase the pressure drop and thereby increase the ratio of layer to riser pressure drop. However, this approach is limited by manufacturing tolerances. Typical fabrication procedures have a finite and absolute limit of dimensional tolerances. For smaller features these tolerances get larger relative importance. For example, conventional machining can provide tolerances in the order of 20 micrometer for small (order of millimeters) channels. If channel size is reduced from one millimeter to one tenth of a millimeter, then the relative tolerances increased from two percent to 20 percent. It can easily be seen that for very small features the pressure drop of each channel will vary largely due to geometric tolerances.

The inventors have realized that a fuel distribution insert, such as a tube can be added to a stack which can provide even fuel supply to every layer (i.e., between each interconnect and the adjacent fuel cell anode electrode) while avoiding the limitations of ever larger risers or smaller channels in each layer.

Figure 3C:
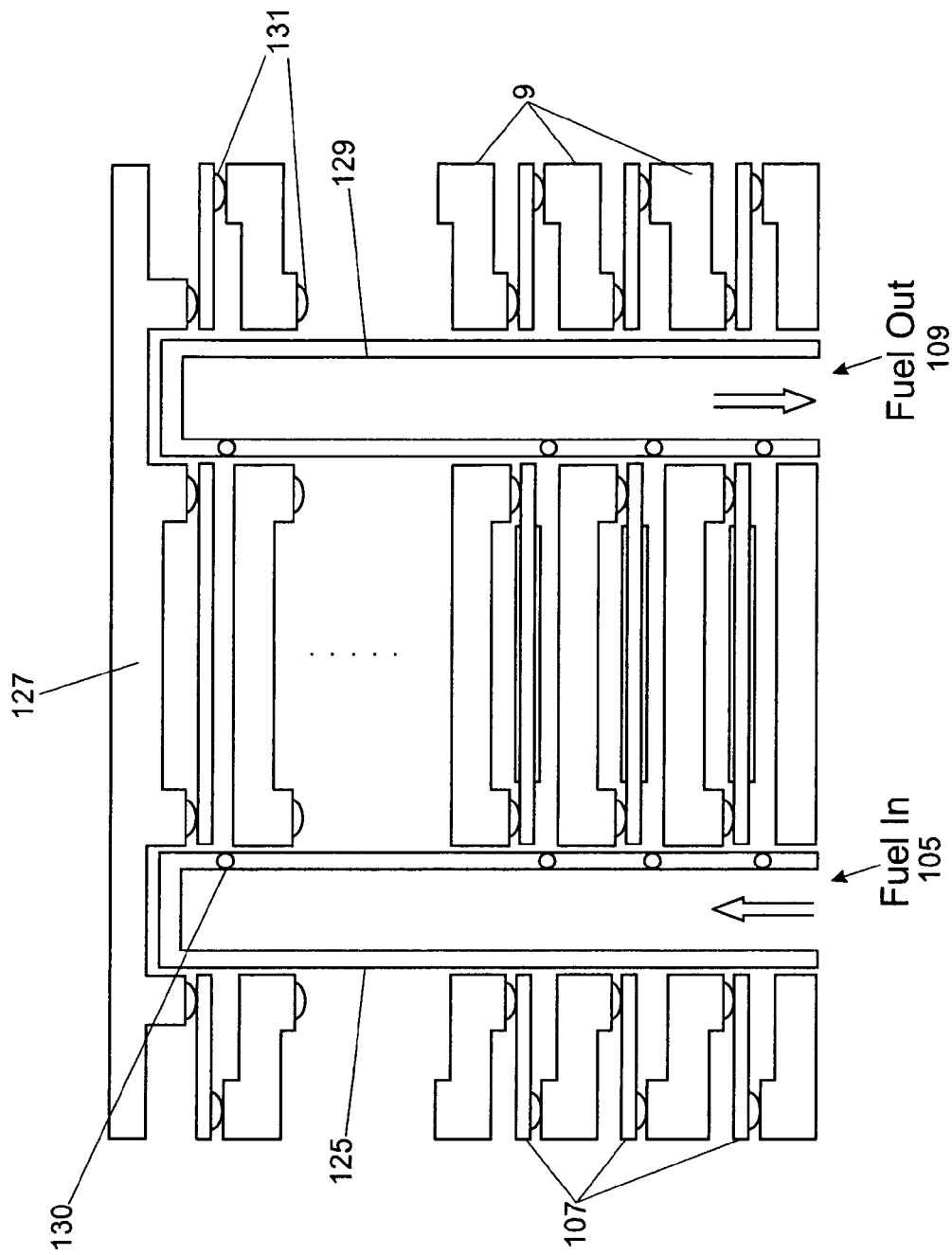

As shown in FIG. 3C, the distribution tube is inserted into at least one riser channel 105, 109. For example, one inlet tube 125 is inserted into the fuel inlet riser channel 105. If desired, a second outlet tube 129 is inserted into the fuel exhaust riser channel 109. If sized properly, it may be sufficient to incorporate only one distribution tube 125 or 129 on either the inlet or the outlet side of the stack, respectively. If the stack 101 contains more than one inlet riser channel 105 and/or more than one outlet riser channel 109, then each of these channels contains a separate distribution tube 125 or 129.

Each tube 125, 129 is closed at one end, such as at the end which abuts one end plate 127 of the stack. Each tube 125, 129 has a number of small and preferably precise holes or openings 130 to even out fuel flow distribution.

In one configuration, small holes are formed, such as drilled, into the distribution tube at regular intervals, similar to a pipe used in irrigation systems. If desired, the holes are formed in locations which correspond to openings between each interconnect 9 and an adjacent anode electrode of a fuel cell 107.

Alternatively, the holes can be formed throughout the tube length. In this case, the stack interconnects, fuel cells and the seals 131 are configured to prevent the fuel from flowing into any space except the space between each interconnect and adjacent anode.

In another configuration, the distribution tube is made of a microporous material, providing a relatively large and well controlled pressure drop. Any suitable materials may be used for the distribution tubes. Both ceramic and metal tubes can be made microporous or can be made solid and accurately drilled with holes. It should be noted that while the tube preferably has a round cross section, it may have a rectangular or other cross sectional shape to fit riser channels which have a non-round cross sectional shape.

If the tube is made of metal and no precaution is taken, then the metal tube can create a short current path between interconnects and thereby destroy the stack. This can be prevented by applying a dielectric to parts of the outer surface of the tube. One example of the dielectric application is thermal spraying of stripes of alumina another ceramic or dielectric material, such as silica, onto the outer surface of the metal tube. The electrically insulating (dielectric) material on the surface of the tube contacts the interconnects to prevent the short circuit. The stripes may be vertical or horizontal. Alternatively, the entire tube may be coated with the insulating material.

In another aspect of the second embodiment shown in FIG. 3D, inlet end 133 of the distribution tube 125, 129 is slightly conical on the outside circumference. In one configuration, the thickness of the wall of the tube is greater at end 133 while the diameter of the inner space of the tube is the same. In another configuration, the thickness of the wall of the tube remains constant, and the diameter of the inner space of the tube is also increased at end 133 together with the outside circumference of the tube. The conical area 133 seals (swages) against the inlet opening 135 of the stack. In this aspect of the second embodiment, each distribution tube 125, 129 becomes part of the stack 107 and the stack can be sealed against the fuel manifold 113 using a face seal 137 at the end plate 127 of the stack, as shown in FIG. 3E.

In another aspect of the second embodiment, each fuel distribution tube 125, 129 becomes part of the fuel manifold 113, as shown in FIG. 3E. The riser channels of the stack are then slid over distribution tubes. In other words, each interconnect and fuel cell of the stack is alternately slid onto the tubes 125, 129 such that the tubes penetrate through the fuel riser openings 105, 109 in the interconnects and the fuel cells. Thus, the distribution tube(s) 125, 129 are also used to aid in the alignment of the stack parts during assembly. Preferably, both distribution tubes 125, 129 are inserted into a jig or onto the fuel manifold 113 to form two parallel poles and the cells and interconnects are alternately slid onto these tubes. When the stack is complete, these tubes are kept with the stack. If the stack is semi-internally manifolded for fuel and contains no fuel outlet riser channel(s) 109 and no fuel outlet distribution tube(s) 129, then only the fuel inlet distribution tube(s) 125 are used for alignment of stack parts during assembly. If the stack is internally manifolded for air, then the air distribution tube(s) may also be used for alignment of stack parts during assembly.

One benefit of the distribution tubes is cheaper, taller stacks with less manifolding, that can run at high efficiency (fuel utilization). The use of the distribution tubes as alignment pins also increases yield and reduces stack assembly costs.

Third Embodiment

Internally Manifolded Interconnect/Externally Manifolded Cell Stack

In a third embodiment of the invention, the fuel cell stack contains internally manifolded interconnects and externally manifolded fuel cells. In this embodiment, the fuel and/or air riser channels extend through openings in the interconnects but outside the fuel cells. In a preferred configuration, both the inlet and outlet fuel and the inlet and outlet air riser channels extend through openings in the interconnects but outside the fuel cells.

Figure 4A:
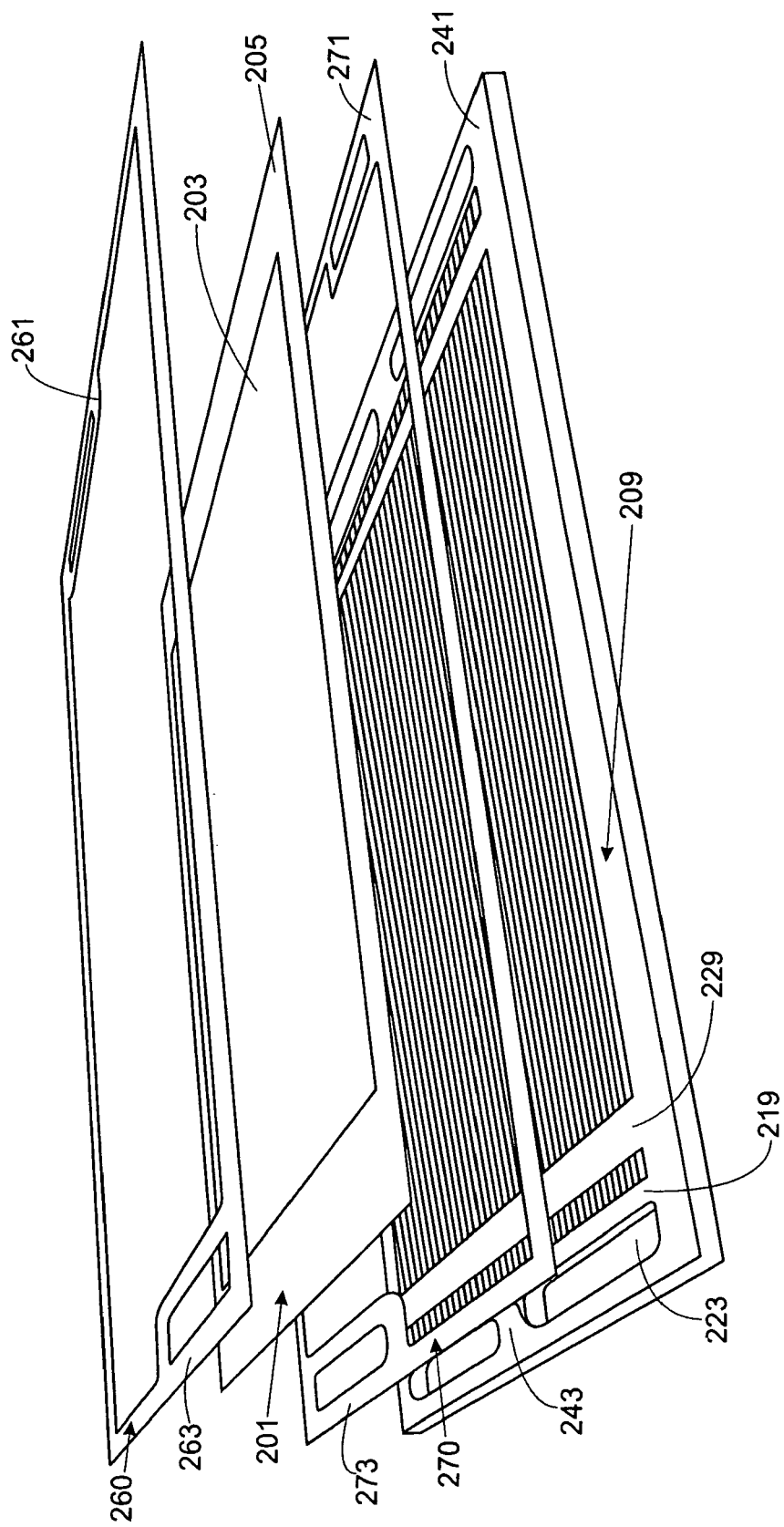
FIGS. 4A to 4E are three dimensional views of components of a fuel cell stack according to the third embodiment of the invention.

FIG. 4A shows one repeating unit of the planar stack of the third embodiment. The unit comprises a fuel cell 201, such as a SOFC. The fuel cell 201 contains an anode electrode 203, an electrolyte 205 and a cathode electrode located below the electrolyte (not shown in FIG. 4A).

The unit also comprises a plate shaped interconnect/gas separator plate 209. The interconnect contains flow fields comprising channels 208 and ribs 210 on both sides. The interconnect may be formed from a metal alloy, such as a chromium-iron alloy, and may be formed by pressing the alloy powder into the desired shape. The interconnect also contains gas openings (which form part of the riser channels) and gas distribution plenums which are shown in more detail in FIGS. 4B and 4C.

Figure 4B:
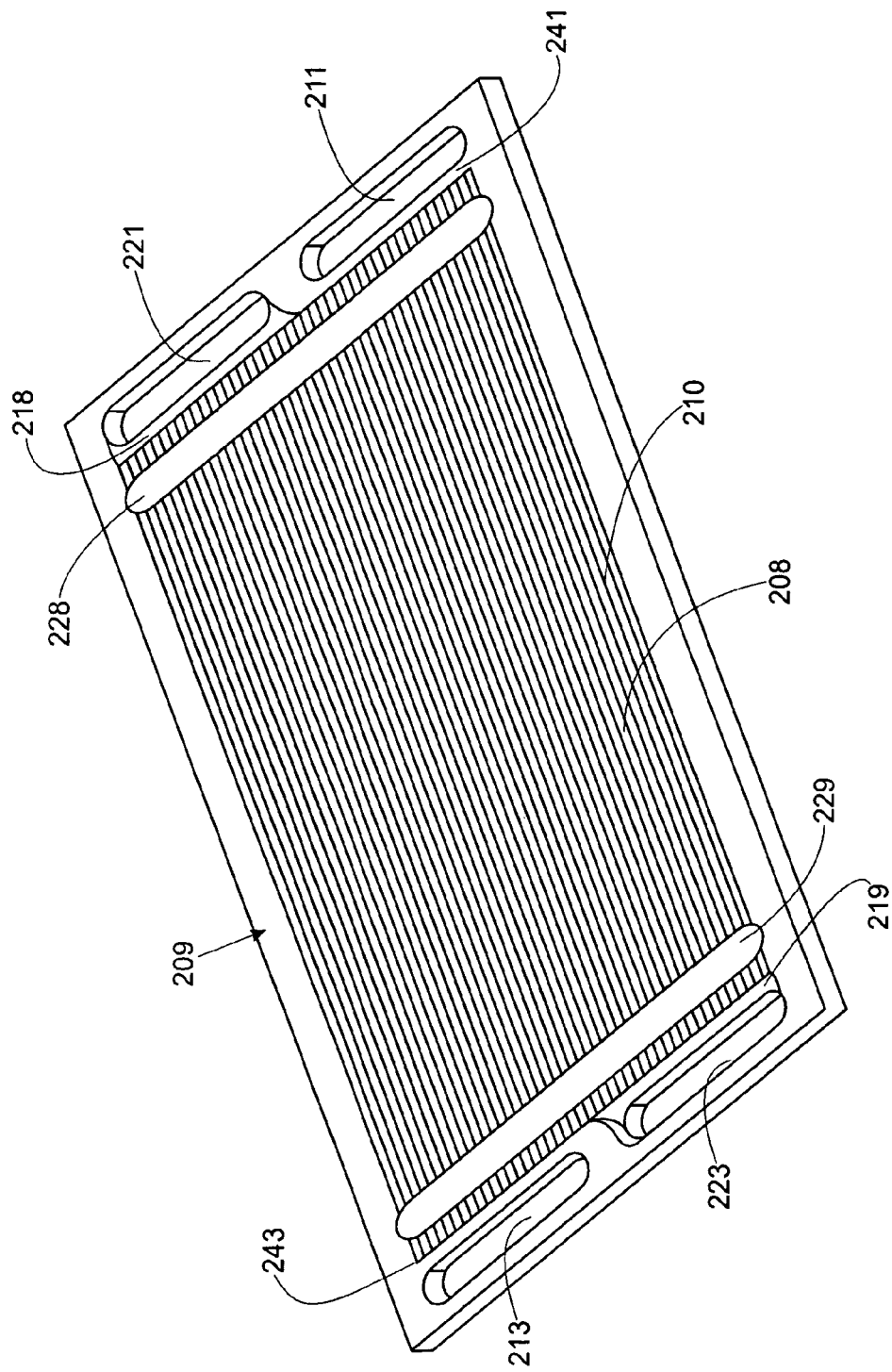
Figure 4C:
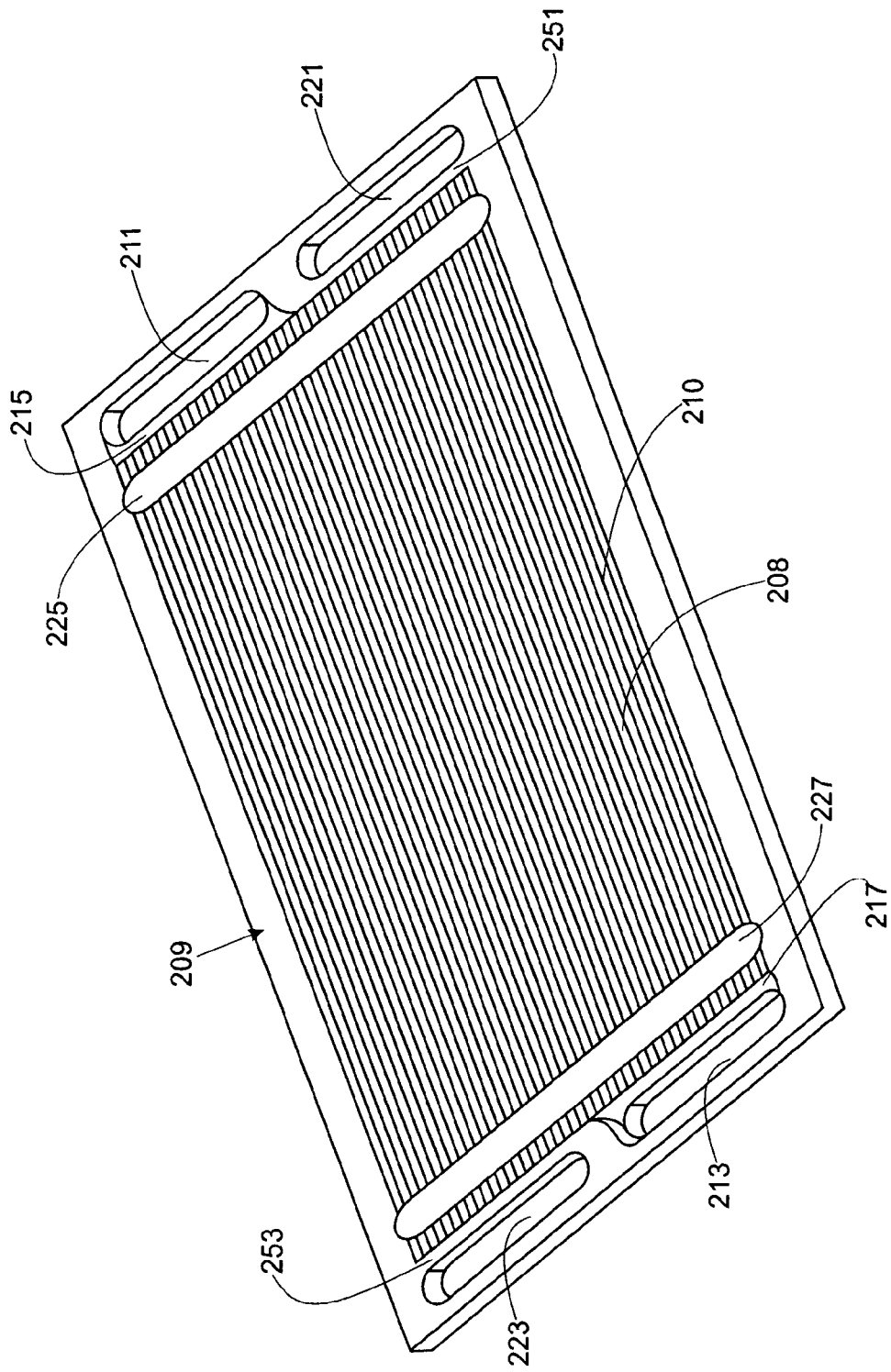

FIG. 4B shows the side of the interconnect 209 which faces the cathode electrode of the adjacent fuel cell 201 (i.e., the top side of the interconnect). FIG. 4C shows the side of the interconnect 209 which faces the anode electrode 203 of the adjacent fuel cell 201 (i.e., the bottom side of the interconnect).

Each side of the interconnect contains two openings or through holes—one fuel opening and one air opening. The respective fuel and air openings are positioned diagonally from each other to provide diagonal counter-flow or co-flow fuel and air streams on opposite sides of the interconnect. Thus, the right side of the interconnect 209 shown in FIGS. 4A-4C contains a fuel opening 211 and an air opening 221. The left side of the interconnect 209 contains a fuel opening 213 and an air opening 223. The fuel openings 211, 213 are arranged diagonally, with one opening 211 adjacent to a first (bottom) edge of the rectangular interconnect and the other opening 213 on the other side of the interconnect being adjacent to the second (top) edge. The air openings 211, 213 are arranged on the opposite diagonal, with one opening 221 adjacent to the second (top) edge of the rectangular interconnect and the other opening 223 on the other side of the interconnect being adjacent to the first (bottom) edge.

Figure 4D:
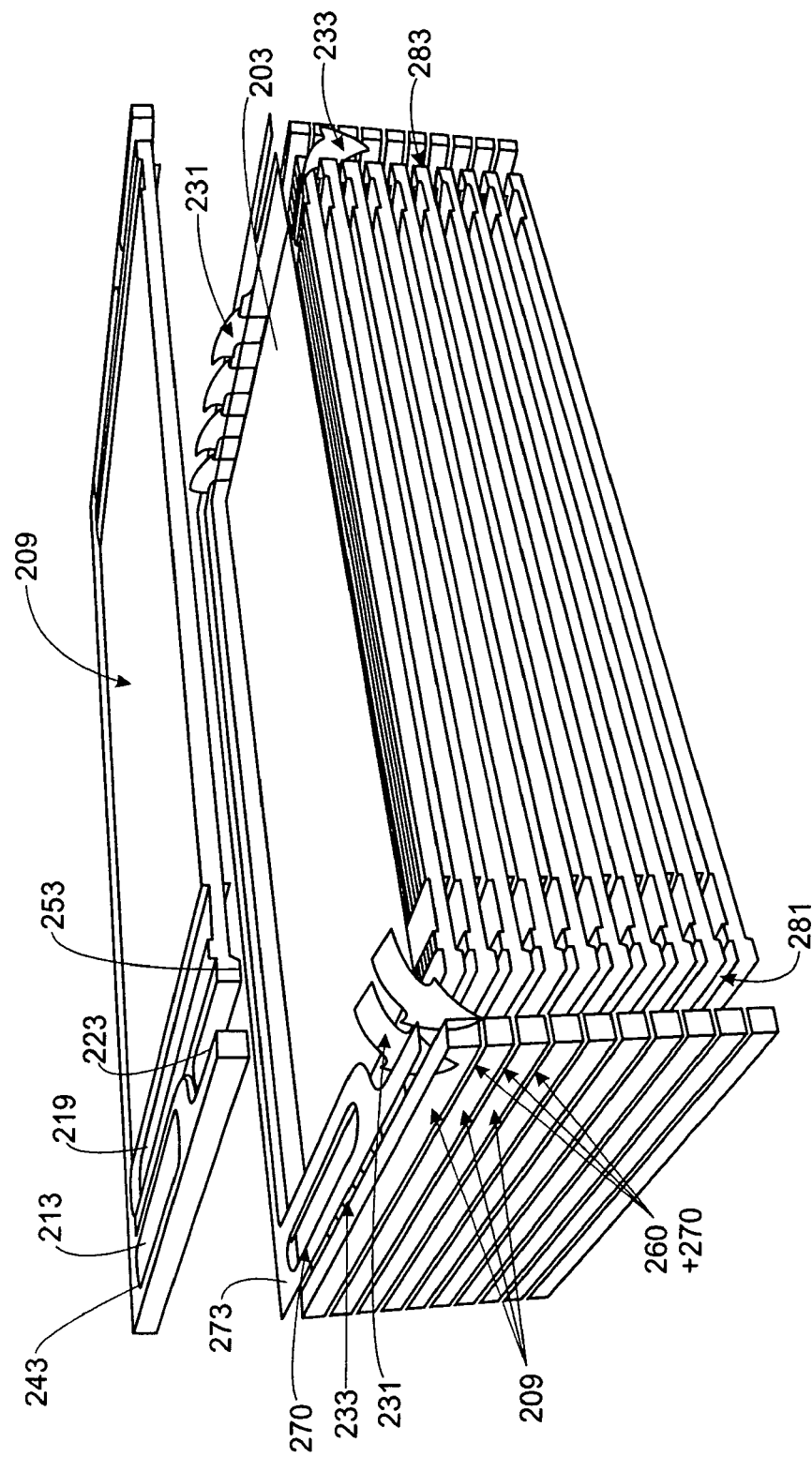

For the diagonal counter-flow configuration shown in FIG. 4D, opening 211 is the fuel inlet opening, opening 213 is the fuel outlet opening, opening 221 is the air outlet opening and opening 223 is the air inlet opening. As shown in FIG. 4D, the fuel 231 flows diagonally from opening 211 to opening 213 on the bottom side of the interconnect 209. The air 233 flows in the opposite diagonal direction from opening 223 to opening 221 on the top side of the interconnect. As shown in FIG. 4D, the gases flow through openings in the interconnects and outside of the cells.

For the diagonal co-flow configuration, opening 211 is the fuel inlet opening, opening 213 is the fuel outlet opening, opening 221 is the air inlet opening and opening 223 is the air outlet opening. The fuel flows diagonally from opening 211 to opening 213 on the bottom side of the interconnect 209. The air flows in the same diagonal direction from opening 221 to opening 223 on the top side of the interconnect.

The interconnect 209 also contains a plurality of fuel and air distribution plenums which comprise recesses in the interconnect. For example, as shown in FIG. 4C, on the fuel (i.e., bottom) side of the interconnect, one fuel distribution plenum 215 is located adjacent to the fuel inlet opening 211 while another fuel distribution plenum 217 is located adjacent to the fuel outlet opening 213. If desired, a third fuel distribution plenum 225 may be located on the fuel inlet side of the interconnect, but separated from the first plenum 215 by a portion of a flow field containing channels 208 and ridges 210. Plenum 225 may stretch across all channels 208. If desired, a fourth fuel distribution plenum 227 may be located on the fuel outlet side of the interconnect, but separated from the second plenum 217 by a portion of a flow field containing channels 208 and ridges 210. Plenum 227 may stretch across all channels 208.

As shown in FIG. 4B, on the air (i.e., top) side of the interconnect, one air distribution plenum 218 is located adjacent to the air inlet opening 221 while another air distribution plenum 219 is located adjacent to the air outlet opening 223. If desired, a third air distribution plenum 228 may be located on the air inlet side of the interconnect, but separated from the first plenum 218 by a portion of a flow field containing channels 208 and ridges 210. Plenum 228 may stretch across all channels 208. If desired, a fourth fuel distribution plenum 229 may be located on the air outlet side of the interconnect, but separated from the second plenum 219 by a portion of a flow field containing channels 208 and ridges 210. Plenum 229 may stretch across all channels 208.

The interconnect 209 also contains barriers which work together with the seals. For example, as shown in FIG. 4B, the fuel openings 211, 213 are surrounded by the upraised barriers 241, 243, which may comprise a ridge in the interconnect, to prevent fuel from flowing on the air (top) side of the interconnect. As shown in FIG. 4C, the air openings 221, 223 are surrounded by the upraised barriers 251, 253, which may comprise a ridge in the interconnect, to prevent air from flowing on the fuel (bottom) side of the interconnect.

As shown in FIGS. 4A and 4D, the stack further comprises fuel side and air side seals 260, 270. The fuel side seal 260 surrounds the periphery of the anode electrode 203 of the fuel cell and is located between the fuel side of the electrolyte 205 and the fuel side of the interconnect. The seal 260 contains two ring or annular shaped portions 261, 263 which are aligned to the air barriers 251, 253 on the fuel side of the interconnect. The air barriers 251, 253 and the mated seal portions 261, 263 together prevent the air from flowing on the fuel side of the interconnect and from coming in contact with the anode electrode of the cell.

The air side seal 270 surrounds the periphery of the cathode electrode of the fuel cell and is located between the air side of the electrolyte 205 and the air side of the interconnect. The seal 270 contains two ring or annular shaped portions 271, 273 which are aligned to the fuel barriers 241, 243 on the air side of the interconnect. The fuel barriers 241, 243 and the mated seal portions 271, 273 together prevent the fuel from flowing on the air side of the interconnect and from coming in contact with the cathode electrode of the cell. As shown in FIG. 4D, the seals 260, 270 contact each other on the sides of the fuel cells 201. The interconnect openings 211, 221, and 213, 223 and the openings 261, 271 and 263, 273 in the contacting portions of seals 260, 270 which are aligned to the interconnect openings together form fuel and air riser channels 281, 283, respectively, located outside the sides of the fuel cells as shown in FIG. 4D.

Figure 4E:
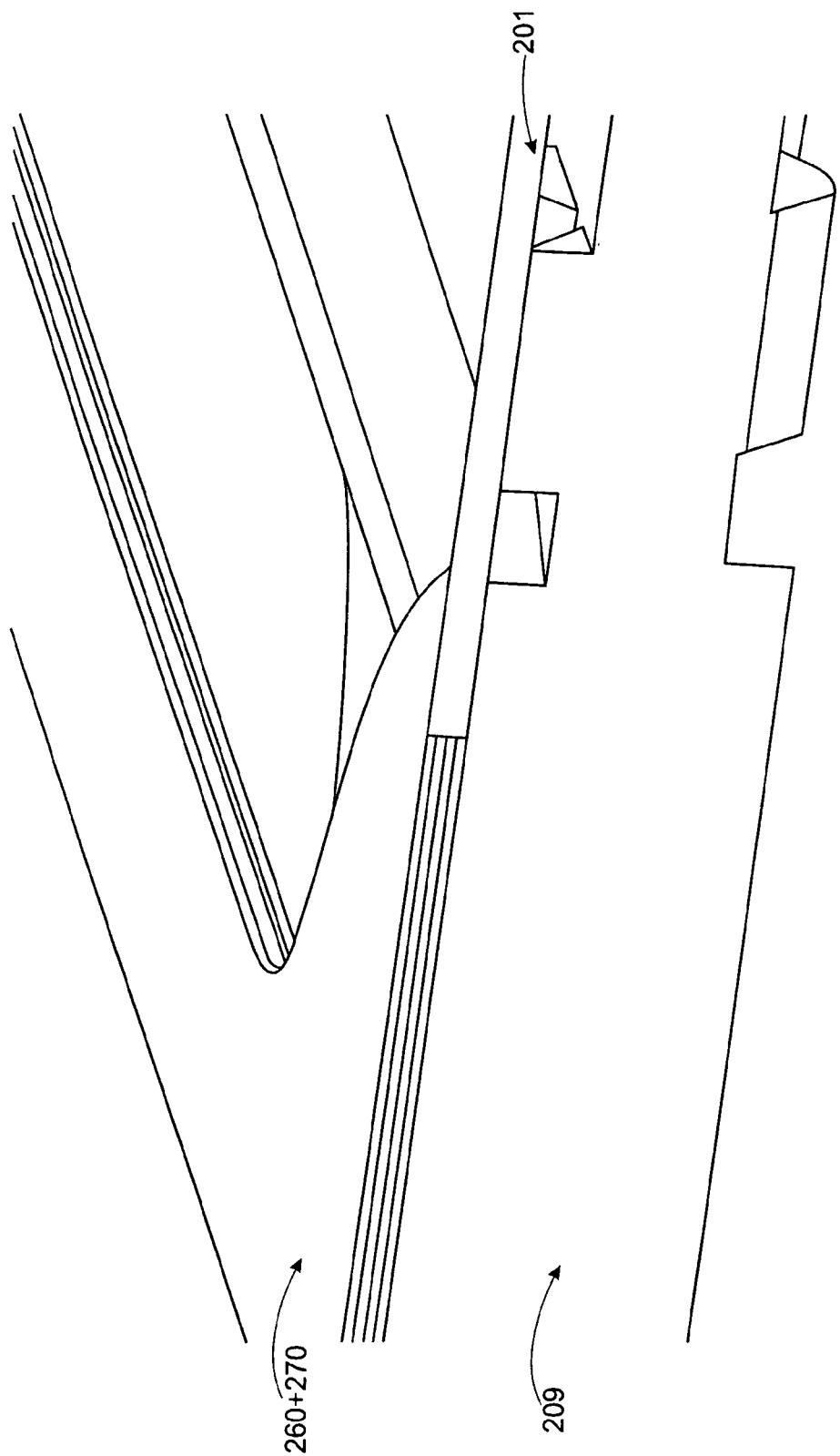

The rectangular seals are preferably made from a soft glass material and support the ceramic cells and metal interconnects on all four sides. This decreases the stresses in the fuel cell stack. FIG. 4E illustrates a portion of the stack to show how the glass seal 260, 270 supports the interconnect 209. This provides a low probability of fuel cell cracking due to seal to rib balancing because the cell is well supported by flexible glass material.

The stack of the third embodiment provides the following advantageous features. Fuel and air gases are internally manifolded through openings in the interconnect. However, no openings are made through the ceramic fuel cell layers, such as the electrolyte, thus simplifying the cell design and manufacturing. The interconnect may comprise a single metal part which contains dimples, channels and/or ribs which define the flow fields. The interconnect can be totally symmetrical on both sides and along its length and width. Cathode and anode features can be identical and reversible. The soft seal material supports the rectangular cells and interconnects on all four sides. The gas flow may be in the diagonal or "X" counter-flow or co-flow directions.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. An interconnect for a fuel cell, comprising:
a fuel distribution plenum;
a single fuel inlet opening, the fuel inlet opening substantially centered in the fuel distribution plenum;
a first set of gas flow channels in a first portion of the interconnect; and
a second set of gas flow channels in a middle portion of the interconnect; wherein the middle portion of the interconnect is aligned with the single fuel inlet opening and wherein the channels of the first set are located in peripheral portions of the interconnect on the two sides of the second set of channels;
wherein:
the interconnect comprises a plate shaped interconnect;
the channels of the first set have a larger depth than the channels of the second set;
the channels of the first and second set are located on a same side of the plate shaped interconnect; and
in use, cross sectional areas of the channels of the first and of the second sets provide a substantially equal gas flow rate through the channels of the first and the second sets.

2. The interconnect of claim 1, wherein each gas flow channel has the same cross sectional area throughout its length.

3. The interconnect of claim 1, wherein the channels of the first set have a larger width than the channels of the second set.

4. The interconnect of claim 1, wherein:
the channels of the first set are adapted to be subjected to a lower pressure drop than the channels of the second set.

5. The interconnect of claim 1, wherein the channels of the first set and the second set are located between the single fuel inlet opening and a fuel outlet opening.

6. The interconnect of claim 1, wherein the channels of the first set have a longer length than the channels of the second set.

7. The interconnect of claim 1, wherein the channels of the first set have a larger cross section area than the channels of the second set.

8. The interconnect of claim 1, wherein the cross sectional area of the channels is graded across the interconnect.

9. The interconnect of claim 1, wherein the channels of the first set have a different cross sectional shape than the channels of the second set.

10. The interconnect of claim 9, wherein the channels of the first set have a cross section shape selected from a group consisting of triangular, rectangular, semi-circular or semi-oval, and the channels of the second set have a cross section shape selected from one of triangular, rectangular, semi-circular and semi-oval.

11. The interconnect of claim 1, wherein:
the fuel inlet opening comprises a fuel riser opening extending through the interconnect for an internally manifolded stack;
the fuel distribution plenum comprises a groove in a surface of the interconnect which surrounds the fuel riser opening; and
the channels of the first and the second sets are straight.

12. An interconnect for a fuel cell stack, comprising:
a fuel distribution plenum;
a single fuel inlet opening, the fuel inlet opening substantially centered in the fuel distribution plenum;
a first set of gas flow channels in a first portion of the interconnect;
a second set of gas flow channels in a middle portion of the interconnect, wherein the middle portion of the interconnect is aligned with the single fuel inlet opening and wherein the channels of the first set are located in peripheral portions of the interconnect on the two sides of the second set of channels;
wherein:
the channels of the first set have a larger cross sectional area than the channels of the second set;
the channels of the first set have a larger depth than the channels of the second set;
the gas flow channels of the first set have a different length than the gas flow channels of the second set; and
in use, the cross sectional areas of the channels of the first and of the second sets provide a substantially equal gas flow rate through the channels of the first and the second sets.

13. An interconnect for a fuel cell stack, comprising:
a fuel distribution plenum;
a single fuel inlet opening, the fuel inlet opening substantially centered in the fuel distribution plenum;
a first set of gas flow channels in a first portion of the interconnect;
a second set of gas flow channels in a middle portion of the interconnect, wherein the middle portion of the interconnect is aligned with the single fuel inlet opening and wherein the channels of the first set are located in peripheral portions of the interconnect on the two sides of the second set of channels;
wherein:
the channels of the first set have a larger cross sectional area than the channels of the second set;
each gas flow channel has the same cross sectional area throughout its length;
the gas flow channels of the first set have a different length than the gas flow channels of the second set; and
in use, the cross sectional areas of the channels of the first and of the second sets provide a substantially equal gas flow rate through the channels of the first and the second sets.

14. The interconnect of claim 13, wherein the channels of the first set have a larger width than the channels of the second set.

15. The interconnect of claim 13, wherein:
the channels of the first set are adapted to be subjected to a lower pressure drop than the channels of the second set.

16. The interconnect of claim 13, wherein:
the interconnect comprises a plate shaped interconnect; and
the channels of the first and the second sets are located on a same side of the plate shaped interconnect.

17. The interconnect of claim 13, wherein the channels of the first set and the second set are located between the single fuel inlet opening and a fuel outlet opening.

18. The interconnect of claim 13, wherein the channels of the first set have a longer length than the channels of the second set.

19. The interconnect of claim 13, wherein the channels of the first set have a larger depth and a larger width than the channels of the second set.

20. The interconnect of claim 13, wherein the cross sectional area of the channels is graded across the interconnect.

21. An interconnect for a fuel cell, comprising:
a fuel distribution plenum;
a single fuel inlet opening, the fuel inlet opening substantially centered in the fuel distribution plenum;
a first set of gas flow channels in a first portion of the interconnect; and
a second set of gas flow channels in a middle portion of the interconnect, wherein the middle portion of the interconnect is aligned with the single fuel inlet opening and wherein the channels of the first set are located in peripheral portions of the interconnect on the two sides of the second set of channels;
wherein:
the channels of the first set have a larger cross sectional shape than the channels of the second set;
the channels of the first set have a different cross sectional shape than the channels of the second set;
the channels of the first set have a cross section shape selected from a group consisting of triangular, rectangular, semi-circular or semi-oval, and the channels of the second set have a cross section shape selected from one of triangular, rectangular, semi-circular and semi-oval; and
in use, cross sectional areas of the channels of the first and of the second sets provide a substantially equal gas flow rate through the channels of the first and the second sets.

22. The interconnect of claim 21, wherein the channels of the first set further have at least one of a larger depth or a longer length than the channels of the second set.

23. The interconnect of claim 21, wherein the interconnect comprises a plate shaped interconnect and the channels of the first and second set are located on a same side of the plate shaped interconnect.

24. An interconnect for a fuel cell, comprising:
a fuel distribution plenum;
a single fuel inlet opening, the fuel inlet opening substantially centered in the fuel distribution plenum;
a first set of gas flow channels in a first portion of the interconnect; and
a second set of gas flow channels in a middle portion of the interconnect, wherein the middle portion of the interconnect is aligned with the single fuel inlet opening and wherein the channels of the first set are located in peripheral portions of the interconnect on the two sides of the second set of channels;
wherein:
the channels of the first set have a larger cross sectional shape than the channels of the second set;
the fuel inlet opening comprises a fuel riser opening extending through the interconnect for an internally manifolded stack;
the fuel distribution plenum comprises a groove in a surface of the interconnect which surrounds the fuel riser opening;
the channels of the first and the second sets are straight;
the channels of the first set have a different cross sectional shape than the channels of the second set; and
in use, cross sectional areas of the channels of the first and of the second sets provide a substantially equal gas flow rate through the channels of the first and the second sets.

25. An interconnect for a fuel cell stack, comprising:
a fuel distribution plenum;
a single fuel inlet opening, the fuel inlet opening substantially centered in the fuel distribution plenum;
a first set of gas flow channels in a first portion of the interconnect;
a second set of gas flow channels in a middle portion of the interconnect, wherein the middle portion of the interconnect is aligned with the single fuel inlet opening and wherein the channels of the first set are located in peripheral portions of the interconnect on the two sides of the second set of channels;
wherein:
the channels of the first set have a larger cross sectional area than the channels of the second set;
the fuel inlet opening comprises a fuel riser opening extending through the interconnect for an internally manifolded stack;
the fuel distribution plenum comprises a groove in a surface of the interconnect which surrounds the fuel riser opening;
the channels of the first and the second sets are straight;
the gas flow channels of the first set have a different length than the gas flow channels of the second set; and
in use, the cross sectional areas of the channels of the first and of the second sets provide a substantially equal gas flow rate through the channels of the first and the second sets.

* * * * *